HARRY MILLER
LEO M. CHRISTENSEN
LEON CHAMPER
INVENTOR.

BY Raymond J. Norton
ATTORNEY

Patented May 15, 1951

2,552,517

UNITED STATES PATENT OFFICE 2,552,517

DISTILLATION UNIT

Leo M. Christensen, Harry Miller, and Leon Champer, Lincoln, Nebr.

Application April 24, 1947, Serial No. 743,504

4 Claims. (Cl. 202—153)

This invention relates to improvements in distillation units, more particularly to distillation units which may be employed either as stripping columns or for concentration or rectification.

In the typical or conventional stripping column used in the alcohol industry to recover the alcohol content of the fermented mash, the alcohol-containing mash is pumped into the stripping still onto a plate, usually about the twentieth from the bottom, and steam is admitted near the bottom of the still to evolve the vapors of alcohol. In normal circumstances the steam pressure employed is substantially 5 pounds per square inch. In such columns each plate is provided with a weir and a down pipe with liquid seal so as to maintain a layer of fermented mash about 1.5 inches in depth on each plate. In operation of the column the steam and alcohol vapors pass through the perforations in each plate and bubble through the liquid contained on such plate. During the upward passage of vapor through the column it becomes progressively richer in alcohol and its temperature falls.

As is known, in this operation the steam which is employed must perform a mechanical as well as thermal work. The pressure of the steam must necessarily be such that the vapor will be forced through the perforations in the plates at a rather high velocity and also must overcome the existing hydraulic head on each plate established by the pool of liquid. In the ordinary operation of an alcohol stripping column the pressure required to accomplish this mechanical work at each plate is equivalent to about 7 inches of water column. The liquid seal at each plate must have substantially this hydraulic head in order to prevent vapor ascending the down pipe and this requires a plate spacing of from 15 to 22 inches. The obvious result is that such a column is usually about 30 feet tall and this exclusive of heaters and condensers.

In addition to this disadvantage of inordinate size prior stills present a number of other disadvantages. One of the serious disadvantages is the fact that the steam pressure and volume must be held at some certain minimum value regardless of the heat requirements of the still. To insure operation of the still enough steam must be admitted to accomplish the mechanical work and then the operator has to balance the heat input by admitting the fermented mash at such a rate to employ the heat content of this required steam flow. It is apparent therefore that such a still is difficult to balance and requires continual attention to maintain it in proper operative adjustment. Yet another serious disadvantage of the older type of unit arises from the fact that at each liquid seal the fermented mash must alter its direction of flow, and when the contents are suspended solids, as in the case of beer stills, there is constant danger of separation and plugging. When this occurs production must be stopped and the still cleaned. In normal circumstances this must be done at regular intervals which shut down periods add materially to the overall cost of operation. Yet another difficulty arises from the necessity to maintain each plate in almost exactly horizontal position. If this is not done the liquid depth on such a plate varies and consequently the vapor flow is not uniform. In commercial operations the plates frequently warp which results in lower capacity and eventually requires careful leveling of the plates.

Many difficulties encountered in operation of a stripping column are present in rectification columns. In the rectification of alcohol the alcohol vapor from the stripping column, having about 50% alcohol content, is admitted to the rectification unit in continuous systems or in discontinuous operations it is condensed and then vaporized into the rectifier. The top of the column is provided with a reflux condenser to pass a downward flow of reflux liquid through which the ascending vapors must pass. In this type of column the plates are equipped with bubble caps covering the plate perforations in order to reduce the bubble size. Otherwise, the operations are quite similar to those in a stripping column and the same difficulties are met. In all such columns the major determining factor in plate efficiency is the effectiveness of heat and material transfer at each plate. This is essentially a function of the area of contact between liquid and vapor and in the conventional designs in the past every effort was made to obtain the smallest possible bubbles.

We have now found that highly efficient distillation columns may be designed which avoid the major difficulties of earlier structures and which provide an exceptionally large distillation capacity for a relatively small volumetric size of still. The new structures are based on a new method of effective heat and material transfer. This is effected by spraying the liquid into a substantially continuous vapor phase rather than, as in the past, distributing the vapor as a discontinuous phase in the continuous liquid phase.

In order to enable a more ready comprehension of the invention a diagrammatic illustration of a typical still embodying the novel concepts is shown in the accompanying drawings in which.

Figure 1:
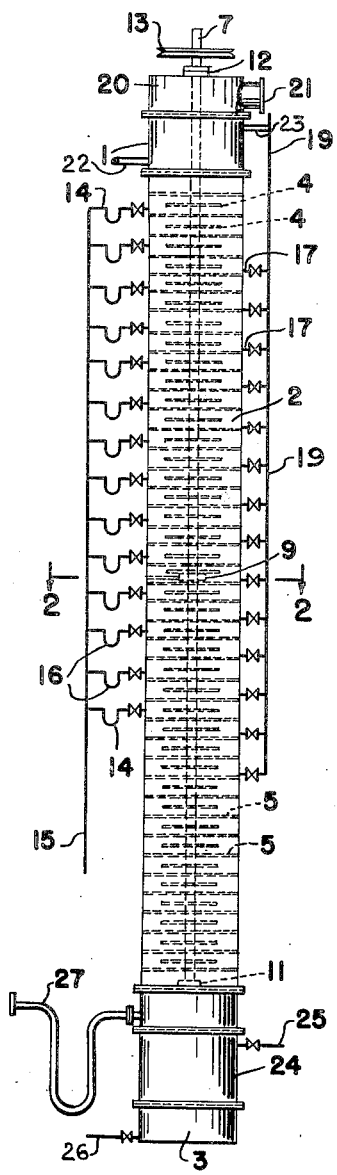
Fig. 1 is a vertical elevation of an improved still.
Figure 3:
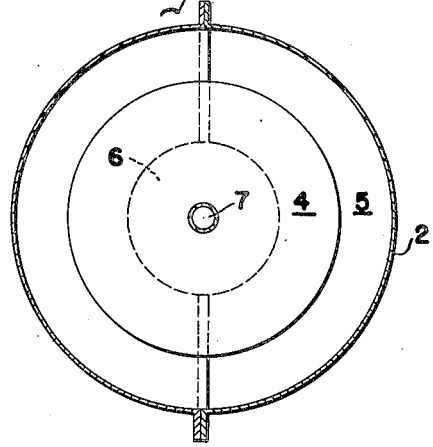
Fig. 3 is an enlarged detail showing a rotor plate.

Because of the fact that a still designed according to the invention has a large capacity for a relatively small heighth it is feasible, as shown in the drawings, to utilize the unit in which the calandria, stripping column, rectifier and beer heater are embodied in a single column or tower. As shown in the drawings such a unit comprises the beer heater 1, a stripping and rectifying section 2 and the calandria 3. In the novel column alternate plates 4 are mounted on a vertical shaft 7 and are adapted to rotate at such a speed that each throws liquid in a sheet against the shell of the column. The rotational speeds required will, of course, vary with the shell diameter but in ordinary circumstances range from about 100 to 300 revolutions per minute. Associated with the rotor plates and alternately positioned with the rotor plates are a series of split annular stator plates 5. The stator plates are welded to the shell in a manner to be more fully described. As will be observed from an inspection of Fig. 3, each stator plate has a central opening 6 through which liquid flows to the subjacent rotor plate and through which vapors rise. According to the invention in a typical still construction of the order of 40 identical rotor plates 4 are secured to the shaft 7. These plates are solid and, as will be observed from an inspection of Fig. 1, are spaced from the inner wall of the still shell. In ordinary circumstances the rotor plates are spaced about 6 inches apart and the stator plates 5 are positioned midway between the rotor plates.

Figure 2:
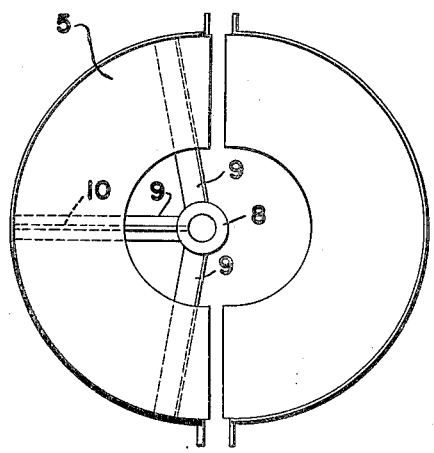
Fig. 2 is a section of the two halves of the shell of the stripping and rectification section at a stator plate.

In the preferred form of construction the still shell is made up of two halves divided vertically to facilitate assembly. The two semi-cylindrical halves of the shell may be provided with vertical flanges which may be bolted or otherwise secured together on assembling the unit. The two halves of each stator plate are welded at their peripheral edges to the inner wall of the shell. The rotating unit, including the driving shaft 7 and the rotor plates, is adapted to be mounted in one half of the shell. As shown in Fig. 2 one or more bearings 8 may be provided in the interior of the still to insure proper alignment of the shaft and avoid whipping. This bearing may be mounted on one shell half by means of the radial supporting arms 9. A pipe 10 may be used to permit lubrication of bearing 8.

The shaft 7 is supported by the ball thrust bearings 11 and 12, respectively secured on the top of the calandria and the top of the column or the top of the beer heater. The shaft may be driven in any suitable manner as, for example by a belt drive associated with the pulley 13.

One half the shell is provided, as shown, with a series of valved draw off pipes or fittings 14 communicating with the line 15. These draw off lines or pipes, as will be observed, are positioned opposite certain of the rotor plates. In the embodiment shown a draw off pipe is associated with each alternate rotor plate so that liquid fractions of any desired characteristics may be withdrawn from the column. The draw off lines may be controlled to remove fusel oil or other desired fractions at predetermined heighths in the column and also to provide samples for tests and analysis. The second half vertical section of the shell similarly may be provided with a series of valved lines 17 which connect with line 19 whereby beer may enter the column at any desired heighth therein and immediately above a stator plate.

In the preferred modification of the improved unit indirect heating is employed and, as previously noted, the calandria, stripping column, rectifier section and beer heater are embodied in a single identical unit or column. The main column is provided with upper and lower horizontal flanges to which the beer heater and calandria respectively are secured. This connection may be made by bolting, riveting, welding or the like.

The beer heater may be of any suitable indirect heating type embodying a heater section and the upper vapor chamber 20 from which rectified vapors pass through the discharge line 21 to a condenser system. The heater section may comprise a series of vertical tubes through which hot vapors from the rectifying section pass, which vapors are then discharged through the line 21 to the condenser system (not shown) from which any desired part or fraction of the condensate is returned as reflux liquid for the column. Vapors condensed in the beer heater flow to the top stator plate. The beer from the beer well, or other beer storage, may be pumped to the heater section through the line 22 and after indirect heat exchange with the vapors passing through the heater is discharged through line 23 to input manifold 19.

The calandria, as shown, is provided with a heater section 24 which includes the steam heating lines 25 and 26. This section constitutes in effect a boiler section in which residual liquid accumulating in the base is heated to produce steam to carry heat up the column. The calandria, as shown, is connected to the slop draw off line 27. The slop recovered through this line may be passed to any suitable system for recovering the valuable protein content as a dried feed.

As pointed out previously, a distillation unit of the type described, presents the marked advantages of a readily fabricated, eminently compact structure which inherently has a wide permissive range of operative latitude in thruput capacity. This is implicit in the fact that in the new system steam is required only for thermal work. The still may be operated at any desired selected pressure since the pressure drop in the tower is practically negligible. The vapor velocities may be varied over a wide range and may be accurately controlled because, unlike the older units, there is substantially no hydrostatic head of liquid to be overcome at each plate. It is preferred to operate the column at vapor velocities of between about 500 and 1000 feet per minute although this velocity is not critical. It will be observed also that the described type of construction insures vapor passages that are substantially uniform in cross-section throughout the column. No liquid seals are employed and consequently the dangers of plugging are practically eliminated.

The striking economy of space and material insured by invoking the principles of the invention can be appreciated from the fact that an effective commercial size unit may be constructed having a total heighth of only about 27½ feet including both the beer still and calandria and with an internal diameter of about 30 inches. In such a unit the combined stripping and rectifying sections are only of the order of 21 feet in heighth and yet includes in this space 41 stator plates and 40 rotor plates. This close spacing, as will be seen, is of a vastly different order than that required in older columns in which, as previously noted, plate spacing of between 15 to about 22 inches were required.

Coupled with this great capacity with minimum size are the further advantages of ease of fabrication and assemblage and eminent simplicity of design in which no liquid seals or down pipes are required or no careful horizontal alignment is necessary.

While a preferred modification of the invention has been described it is to be understood that this is given to typify all those structures, however different in design, which invoke the novel principles of dispersion of liquid into a continuous vapor phase in a countercurrent stripping or rectifying column.

We claim:

1. An alcohol still comprising, a vertically split cylindrical tower, a beer heater mounted on the upper end of one of the sections of the tower in direct communication therewith, a calandria mounted at the base of the tower, a vertical series of imperforate plates mounted for rotation in the tower section between the beer still and calandria, said plates being spaced from the inner wall of the tower; a corresponding series of alternately positioned centrally apertured bipartite stator plates fixed to the inner wall of the tower, means to heat the contents of the tower, means to pass liquid from the beer heater to the upper section of the tower and means to withdraw stripped vapors from the tower through the beer heater.

2. An apparatus in accordance with claim 1 in which means are provided to introduce reflux condensate to the tower at predetermined sections thereof.

3. An apparatus in accordance with claim 1 in which means are provided to withdrawn liquid from the tower at points opposite the rotor plates.

4. An alcohol still for the recovery of volatiles and deposited solids from fermented mash, comprising a first semi-cylindrical tower section, a beer heater mounted on the upper end of the said first tower section, a calandria mounted at the base of the said first tower section, a vertical series of imperforate plates mounted for rotation in the said first tower section between the beer still and the calandria, said plates being spaced from the inner wall of said first tower section, a corresponding series of alternately positioned, half-stator plates fixed to the inner wall of said first tower section; a second semi-cylindrical tower section detachably secured in pressure-tight relation to said first tower section, beer still and calandria, said second tower section mounting a complementary set of half-stator plates forming with the first said half-plates a series of centrally apertured stator plates; means to heat the contents of the tower, means to pass liquid from the beer heater to the upper section of the tower and means to withdraw stripped vapors from the tower through the beer heater.

LEO M. CHRISTENSEN.
HARRY MILLER.
LEON CHAMPER.

REFERENCES CITED

The following references are of record in the file of this patent:

UNITED STATES PATENTS

| Number | Name | Date |
|---|---|---|
| 332,361 | Rankin | Dec. 15, 1885 |
| 662,780 | Emerson | Nov. 27, 1900 |
| 996,328 | Guillaume | June 27, 1911 |
| 1,208,534 | Foret | Dec. 12, 1916 |
| 1,487,182 | Rodebush | Mar. 18, 1924 |
| 1,538,335 | Koehler | May 19, 1925 |
| 1,732,805 | D'Yarmett | Oct. 22, 1929 |
| 1,888,872 | D'Yarmett | Nov. 22, 1932 |
| 1,957,818 | Carney | May 8, 1934 |
| 2,189,230 | Sheldon | Feb. 6, 1940 |

FOREIGN PATENTS

| Number | Country | Date |
|---|---|---|
| 180,676 | Switzerland | Nov. 15, 1935 |